(12) United States Patent
Spikings

(10) Patent No.: US 6,534,728 B1
(45) Date of Patent: Mar. 18, 2003

(54) TRACTOR LOAD WEIGHING DEVICE

(76) Inventor: Mark Spikings, 84 Northampton Road, Broughton, Kettering, Northants (GB)

( * ) Notice: Subject to any disclaimer, the term of this patent is extended or adjusted under 35 U.S.C. 154(b) by 0 days.

(21) Appl. No.: 09/719,442

(22) PCT Filed: Jun. 11, 1999

(86) PCT No.: PCT/GB99/01852

§ 371 (c)(1),
(2), (4) Date: Dec. 12, 2000

(87) PCT Pub. No.: WO99/66296

PCT Pub. Date: Dec. 23, 1999

(30) Foreign Application Priority Data

Jun. 12, 1998 (GB) .............................. 9812782

(51) Int. Cl.⁷ .............................. G01G 19/08
(52) U.S. Cl. .................. 177/136; 701/50; 702/174; 111/903
(58) Field of Search ................ 177/136, 137, 177/138, 139, 211, 147; 701/50; 702/101, 102, 174; 73/1.13; 111/903

(56) References Cited

U.S. PATENT DOCUMENTS

| | | | | |
|---|---|---|---|---|
| 3,363,707 A | * | 1/1968 | Murray | 177/136 |
| 3,955,636 A | * | 5/1976 | Askew | 177/137 |
| 3,990,032 A | * | 11/1976 | Fish et al. | 177/136 |
| 4,212,360 A | * | 7/1980 | Chester | 177/139 |
| 4,362,097 A | * | 12/1982 | Rogers | 177/136 |
| 4,411,325 A | * | 10/1983 | Hamilton | 177/136 |
| 4,421,186 A | | 12/1983 | Bradley | 177/139 |
| 5,376,760 A | * | 12/1994 | Horsley | 177/137 |
| 5,384,436 A | | 1/1995 | Pritchard | 177/136 |
| 5,717,167 A | * | 2/1998 | Filing et al. | 177/136 |
| 5,902,966 A | * | 5/1999 | VonMuenster | 177/136 |
| 5,959,257 A | * | 9/1999 | Campbell et al. | 177/136 |

FOREIGN PATENT DOCUMENTS

| | | | | |
|---|---|---|---|---|
| DE | 371462 A1 | * | 11/1988 | 111/903 |
| EP | 0287165 A1 | | 10/1988 | |
| EP | 0303325 A2 | | 2/1989 | |
| EP | 407705 A1 | * | 1/1991 | 177/25.11 |
| EP | 0650661 A2 | | 5/1995 | |
| EP | 0797082 A1 | | 9/1997 | |
| GB | 2228093 A | | 8/1990 | |

* cited by examiner

Primary Examiner—Randy W. Gibson
(74) Attorney, Agent, or Firm—Summa & Allan, P.A.

(57) ABSTRACT

A device for monitoring a load in a container (16) being towed or carried by a tractor or other vehicle. The device comprises a top link (30) connecting a part (28) of the container to a tool frame (26) or the like of a tractor or other towing vehicle. The tension in the link is dependent on the weight of the load in the container, and a load cell (36) comprising an array of strain gauges is provided to measure the tension in the link and provide an indication of the tension at a position remote from the link, for example in a tractor cab.

8 Claims, 3 Drawing Sheets

TRACTOR LOAD WEIGHING DEVICE

This invention relates to a device for use with a tractor-carried container which enables the container load to be monitored.

Seed drilling and fertilizer spreading is often carried out using a hopper attached to the rear of a tractor on a cantilevered frame. Support for the hopper is typically provided by a lower beam, which can be raised and lowered by a hydraulic mechanism on the tractor and about which the hopper is pivotable, and a top link in the form of a load-bearing turnbuckle which is under tension and which can be used to adjust the angular position of the hopper.

In seed drilling or fertilizer spreading, it is important to spread the seed or fertilizer in the correct amount per unit area. For example, the most usual method of drilling is to allocate a weighed trailer load of seed to the area to be drilled on the basis of the intended seed rate in Kg/hectare. The drill manufacturer's calibration routine may have been carried out on a proportion of the seed outlets in preparation. The seed is transferred in the field from the trailer to the drill hopper by means of an auger and sowing begins. The hopper is replenished as-necessary and a tally is kept of the number of refills. Checking the number of refills against the hectare meter of the tractor gives some indication of seed rate, but it is difficult to estimate how much seed is left in a partly full hopper so that the true seed rate can only be determined when the trailer is empty. This process generally necessitates adjustments to the seed flow from time to time so that although the overall intended seed rate may be achieved the distribution may be uneven. There is therefore a need for a weighing mechanism which will give an indication of the amount of seed or other material left in the hopper at any given time.

DE-A-3714642 describes an agricultural spreader carried on a tractor tool frame by a three-point lifting device. A top link of the lifting device, which is under tension, incorporates a weighing device to monitor the weight of the load in the spreader and the rate of spreading. A problem which arises with the use of such a tension link as a weighing device is that the measured weight may vary according to the angular orientation of the link. In particular, the weight distribution over a three-lifting device may vary according to whether the tractor is on level ground or on a slope.

EP-A-407705 discloses a three-point lifting device for a tractor-mounted hopper in which the weight of the hopper is measured by sensors at each of the three load-bearing points of the device. The angular orientation of the device is also sensed and a signal is fed to a microprocessor together with signals from each of the three weight-sensors.

EP-A-537857 and EP-A-797082 also disclose lifting devices incorporating a strain gauge or other weight sensor and an angle measuring cell arranged to correct measured weight values to compensate for the angular position of the tractor and container.

The present invention provides a device for monitoring a load in a container being towed or carried by a tractor or other vehicle, the device comprising one or more strain gauges to provide a signal indicative of the load at a position remote from the device and a level indicator adapted to give a signal indicative of the angular orientation of the device relative to the horizontal, characterised in that the strain gauge or gauges and the level indicator are incorporated together in a tension link securable to the container as part of a towing or support mechanism therefor, such that the tension in the link is dependent on the weight of the load in the container, the signal provided by the strain gauge being indicative of the tension in the link and the level indicator being mounted in the tension link so as to be rotatable relative thereto about a horizontal axis, to set an orientation for calibration of the device.

The device of the invention is preferably in the form of a top link extending between a tractor and the container, for example a hopper which is pivotally mounted on a cantilevered frame. The link is preferably in the form of a turnbuckle so that the angular position of the container can be adjusted.

The link preferably includes a load cell, comprising an array of strain gauges, arranged to provide an indication of the tension in the link, to be displayed in a cab of the towing or carrying vehicle. The display can be calibrated with the container both empty and filled with a known quantity of specified material such as particular seed or fertilizer, with the same orientation of the device as shown by the level indicator, so that the tension reading gives an indication of how much remains in the container at any given time. The tension data can also be used, with the aid of a suitable microprocessor, to provide an indication of the rate at which material is being distributed from the container, by linking the measured load in the container, and its rate of depletion, with the speed of the vehicle and the area being swept by it.

A rough reading can be displayed continuously, with more accurate readings being taken from time to time by stopping on relatively level ground and using the lifting device to set the tension link at the predetermined orientation at which calibration took place.

A preferred embodiment of the invention will now described with reference to the accompanying drawings wherein.

Figure 1:
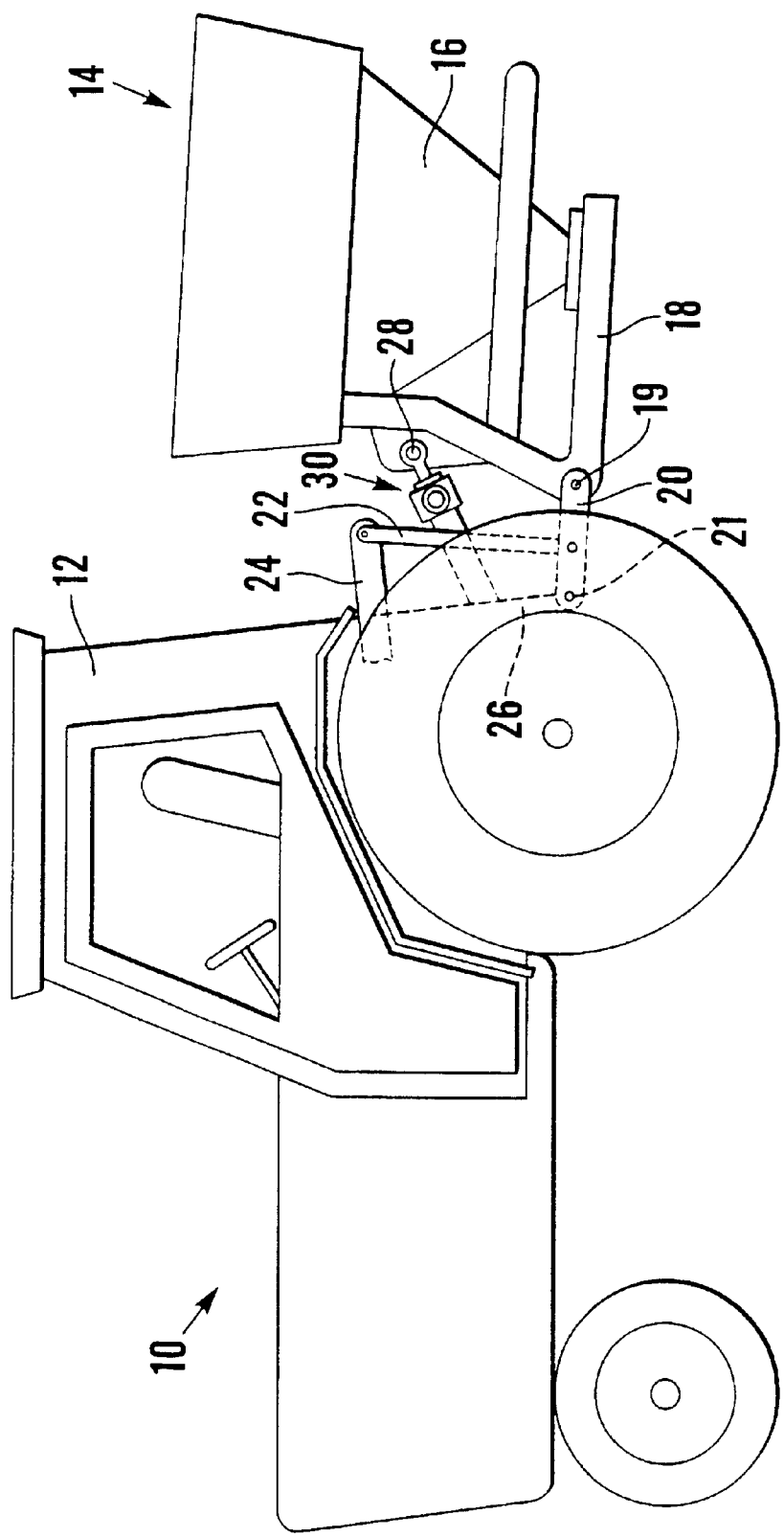
FIG. 1 is a schematic side elevation of a tractor and seed drill combination incorporating a weighing device in accordance with the invention.

Referring first to FIG. 1, a tractor generally indicated by 10, having a cab 12, carries a seed drill 14 in the form of a hopper 16 supported on a cantilevered frame 18 comprising a pair of substantially L-shaped frame members, one on each side of the hopper, pivoted at coaxial pivot points 19 to a pair of parallel levers 20 which in turn are pivotally attached at pivot points 21 to a rigid tool frame 26 mounted at the rear of the tractor. A pair of operating levers 24, arranged to be raised and lowered by the tractor motor, are connected to the levers 20 by connecting rods 22 to raise and lower the levers 20 and hence also raise and lower the seed drill 14.

A top link 30 connects a higher part 28 of the hopper frame to the tool frame 26. It is this top link which incorporates a load cell, comprising an array of strain gauges, forming part of a weighing device in accordance with the invention, as will be described in more detail with reference to FIG. 2.

Figure 2:
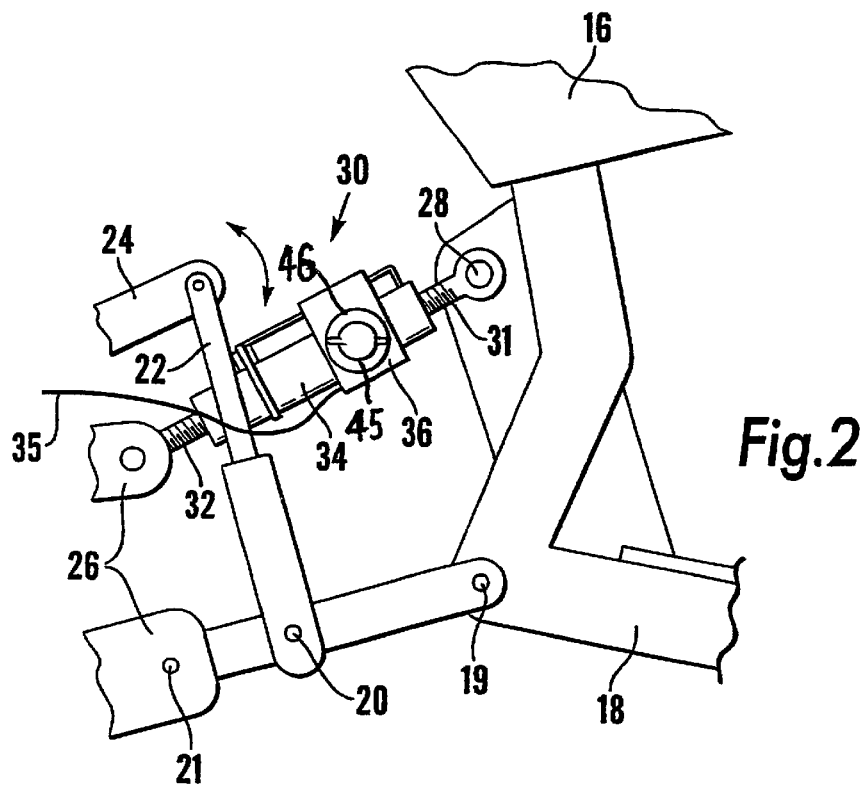
FIG. 2 is an enlarged partial view of the top link and tension gauge of the device of FIG. 1.

Referring now to FIG. 2, the tension link 30 comprises a pair of threaded rods 31, 32, pivotally connected respectively at 28 to the hopper frame and 26 to the tool frame of the tractor. The tension bar is positioned centrally, midway between the rear wheels of the tractor, with the link rods 22 of the two lever systems positioned on each side of it.

The respective threaded portions of the rods 31, 32 are connected by a turnbuckle 347 which can be used to adjust the overall length of the tension bar and hence the angular position of the hopper.

Because the centre of gravity of the hopper is located well behind the pivot 19, the hopper has a tendency to swing backwards and downwards away from the tractor. It is prevented from doing so by the tension link 30, which is accordingly under permanent tension. The magnitude of this tension will of course depend on the total weight of the hopper and its contents, and thus can be used to give an indication of what weight of material is in the hopper.

The turnbuckle 34 is associated with a load cell 36 arranged to measure the tension in the link and to feed a tension reading to a microprocessor and digital display as will be discussed below.

Because emptying of the hopper will cause a shift in its centre of gravity, the tension measured by the load cell may not be directly proportional to the weight of material in the hopper. Nonetheless, the relationship will be sufficiently close to a linear one to give a useful reading with the display calibrated with full and empty readings. The microprocessor can in any case be programmed to compensate for a degree of non-linearity.

Figure 3:
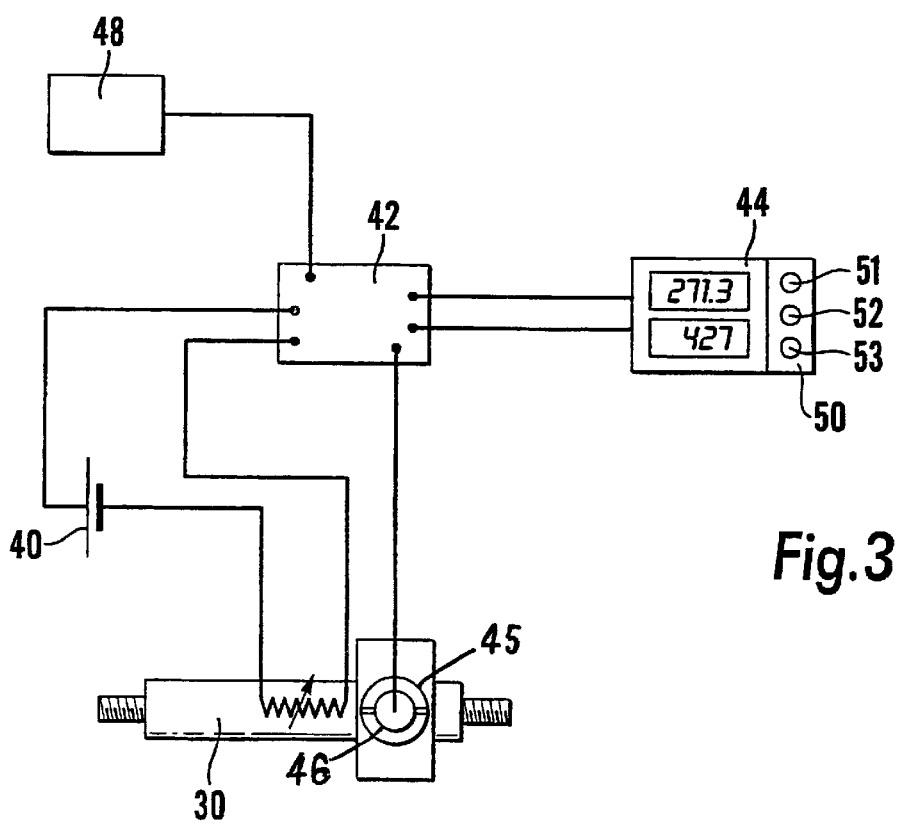
FIG. 3 is a schematic circuit diagram for the device.

FIG. 3 shows schematically the circuitry used to give an in-cab display of the hopper contents.

As can seen in FIG. 3, the load cell 36 effectively comprises a variable resistor, the resistance of which varies according to the tension in the top link 30. The power supply to the load cell is provided by the tractor battery 40, and the resistance in the load cell is measured by a microprocessor 42. This in turn sends a signal to a digital display 44 located in the tractor cab.

Raising and lowering the hopper will swing the top link through small angle. The load cell incorporates a level indicator 46 which feeds to the microprocessor a signal indicative of the angular orientation of the load cell, and hence of the hopper, which can affect the reading given by the load cell which will accordingly require correction.

The level indicator includes a rotatable knob 45 which is used to set the orientation at which calibration is to take place. The in-cab display 44 also includes a set of indicator lights or light-emitting diodes 50, with upper and lower red lights 51, 53 and a central green light 52. When the device is at the desired orientation, only the green light shows. When the device moves through a predetermined minimum angle from this orientation, one or other of the red lights shows.

Figure 4:
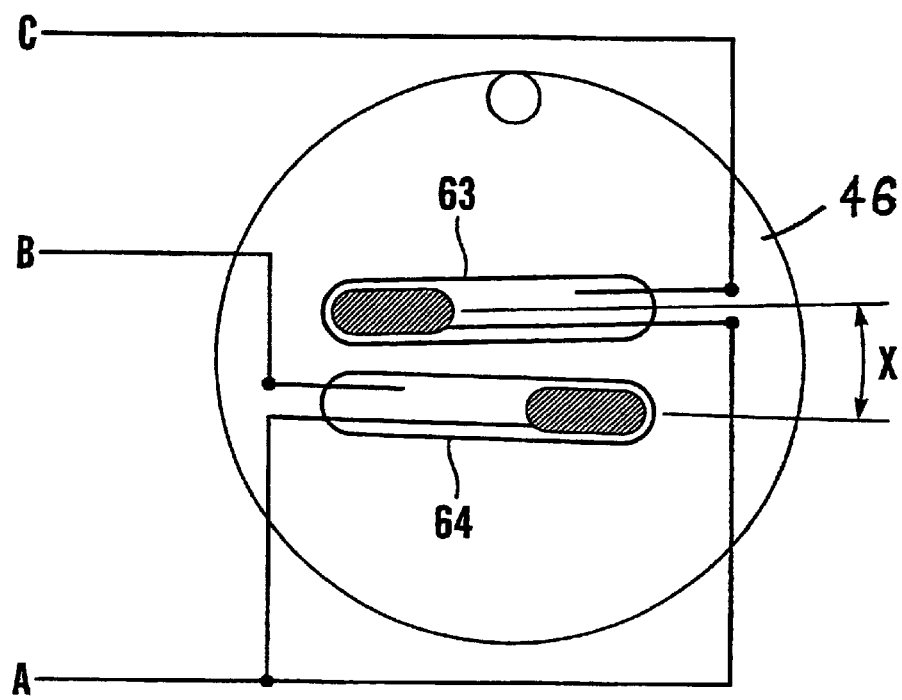
FIG. 4 shows schematically an arrangement of switches for the level indicator.

As shown in FIG. 4, the level indicator 46 comprises a pair of mercury switches 63 and 64, mounted within the device so as to be rotatable together with the knob 45 while remaining in fixed orientations relative to one another. The two mercury switches have an angle X between them of a few degrees, typically 2 to 5°. Each of the switches 63, 64 has one terminal connected to a point A of an indicator circuit. Switch 64 has its other terminal connected to point B of the indicator circuit, and switch 63 has its other terminal connected to a point C of the same circuit. Connecting A to B will illuminate one red light and connecting A to C will illuminate the other red light. If neither connection is made, the green light shows, indicating that the device is level.

In the horizontal position shown in FIG. 4, both switches are open so that only the green light will show, indicating that the unit is at the correct level for calibration. If the unit is rotated slightly clockwise as shown in FIG. 4, switch 63 will close, connecting A and C, while 64 remains open. If the unit is rotated a few degrees anti-clockwise, switch 63 will open again while switch 64 closes, connecting B to A.

A corrected reading of the measured resistance in the load cell will give an indication to the driver in the cab of the contents of the hopper. The microprocessor 42 may however also use data from the tractor's hectare meter 48, which indicates the area being swept by the tractor, to give a continuous or intermittent reading of the rate at which seed in being distributed, in units of weight per unit area, usually Kg/hectare. The driver can then adjust the feed rate of the hopper, to ensure at an early stage that the correct amount of seed is being distributed.

The mode of operation of the described system is suitably as follows:

1. Place the tractor on a level surface.
2. Raise the hopper to the desired weighing height, which in the case of a fertilizer spreader will be the operational height.
3. Adjust the level indicator 46 so that only the green light 52 shows.
4. Calibrate the system by recording and entering the hopper weight when empty and when filled with a load of known weight of product.
5. Start spreading or drilling checking the weight in the hopper at any time by raising the spreader to the desired weighing height, at which only the green indicator light shows.

There is thus provided a load monitoring system which enables the correct distribution of seed, fertilizer etc. from an early stage in the operation rather than by trial and error.

What is claimed is:

1. A device for monitoring a load in a container being towed or carried by a tractor or other vehicle, the device comprising
   at least one strain gauge to provide a signal indicative of the load at a position remote from the device and
   a level indicator adapted to give a signal indicative of the angular orientation of the device relative to the horizontal,
   wherein said at least one strain gauge and said level indicator are incorporated together in a tension link securable as a single unit to the container as part of a support mechanism for the container, such that the tension in said single unit link is dependent on the weight of the load in the container,
   the signal provided by said strain gauge being indicative of the tension in said single-unit tension link and
   said level indicator being mounted in said single-unit tension link so as to be rotatable relative thereto about a horizontal axis, to set an orientation for calibration of the device.

2. A device according to claim 1 wherein the link is in the form of a turnbuckle.

3. A device according to claim 1 wherein the link includes a load cell comprising an array of strain gauges, arranged to provide an indication of the tension in the link.

4. A device according to claim 1 wherein the level indicator comprises a plurality of mercury switches in fixed positions relative to one another but rotatable together as a unit about a horizontal axis, different combinations being open or closed according to the angular orientation of the unit.

5. An assembly comprising a device according to claim 1 mounted as a top link extending between a tractor and container, the container being pivotally mounted on a cantilevered frame.

6. An assembly according to claim 5 wherein the container comprises a hopper arranged to deposit the load at a controlled rate.

7. An assembly according to claim 5 wherein said indication of tension in the link is provided in a cab of the tractor.

8. A method of monitoring the controlled distribution of bulk material from the container of an assembly according to claim 5, which comprises the steps of calibrating a display, indicative of the tension in the link with the container both empty and filled with a known quantity of said bulk material and the tension link at the same orientation in each case, and thereafter using tension readings from said display as an indication of how much of said material remains in the container at any given time.

\* \* \* \* \*